Patented Dec. 26, 1939

2,184,934

UNITED STATES PATENT OFFICE 2,184,934

PREPARATION OF ESTERS OF METHA-CRYLIC ACID

Herman A. Bruson, and Robert N. Washburne, Philadelphia, Pa., assignors to Röhm & Haas Company, Philadelphia, Pa.

No Drawing. Application July 13, 1937, Serial No. 153,358

15 Claims.  (Cl. 260—486)

This invention relates to a catalytic process for the preparation of esters of methacrylic acid from the corresponding esters of α-hydroxy-isobutyric acid.

It has been found that under the proper conditions of temperature, space velocity and presence or absence of diluents certain catalysts will bring about the dehydration of esters of α-hydroxy-isobutyric acid in the vapor phase and yield the corresponding ester of methacrylic acid.

Many dehydrating catalysts can be used for the purpose of this invention. Among those useful may be mentioned thoria, silica gel, activated alumina, basic aluminum sulfate, meta- or ortho-phosphoric acid supported on diatomaceous earth or graphite, and various combinations of aluminum and phosphoric acid.

The catalysts which are most effective for this purpose are principally those which contain aluminum oxide in combination with phosphoric acid. Part of the aluminum, up to about 50% on a molecular weight basis, may be replaced by manganese or magnesium.

These catalysts are effective at temperatures of about 325° C. to 425° C. Besides the direct dehydration of the α-hydroxy-isobutyric acid ester to methacrylic acid ester, there are side reactions taking place which yield undesirable products, usually being gaseous or having a low boiling point. At temperatures above 425° C. the amount of these undesirable by-products which are formed may become excessive and below 325° the reaction is very slow. In both cases the yield is considerably lower than that obtained within the above temperature range.

The effect of the space velocity on the yield of methacrylic acid ester is normal. The expression "space velocity" means the total volume of vapor measured in cubic centimeters at 760 mm. at 0° C. which pass per cubic centimeter of catalyst per hour. A decrease in the time of contact between the α-hydroxy-isobutyric acid ester and the catalyst results in less decomposition of the ester, consequently in a lower yield of the methacrylic acid ester. It has been found that a temperature of 375° C. gives the best results in most cases. Generally, reducing the temperature to 325° decreases the total amount of the α-hydroxy-isobutyric acid ester decomposed but does not change the yield of the methacrylic acid ester calculated on the total amount of α-hydroxy-isobutyric acid ester decomposed. The total result, however, is a decrease in the actual yield of the methacrylic acid ester. On increasing the temperature to 425° a more complete decomposition of the α-hydroxy-isobutyric acid ester is obtained but the total yield of the methacrylic acid ester is poor. The increase in temperature causes an increase in the amount of secondary decomposition and naturally reduces the yield of the methacrylic acid ester.

It has also been found advantageous to use diluents such as water, alcohol, benzine, etc. It is apparent that water has a specific effect on the reaction because benzol and alcohol had a tendency to decrease the yield, also to decrease the total decomposition of the α-hydroxy-isobutyric acid ester. The effect of the water also changes somewhat with the temperature at which the reaction is carried out. Using a contact material which requires a temperature of 400° C., water is beneficial, whereas at 375° C. the effect is somewhat less apparent. It is possible that water may prevent too great a rehydration of the contact material at the higher temperature. Good results have been obtained when the molar ratio of water to the ester is about 2:1.

The process is carried out in general by vaporizing the ester of α-hydroxy-isobutyric acid, adding the proper amount of water vapor and passing the mixture over a heated catalyst at the desired temperature. The resulting products are condensed and fractionally distilled to obtain the pure methacrylic acid ester.

The process may be illustrated by the following examples:

1. A catalyst is prepared by mixing ammonium phosphate with freshly precipitated aluminum hydroxide. 400 g. of Al(NO₃)₃·9H₂O is dissolved in 2.5 liters of water and precipitated at 70° with ammonium hydroxide. The precipitate is filtered immediately, washed twice with 200 cc. of water and the cake pressed. This cake is then mixed in a mortar with 324 g. of diammonium phosphate and the paste dried over a steam bath and in an oven at 105°. The dried material is then broken and placed in a converter tube at 200° to 220° C. Air is passed through the tube, the temperature raised to 400° and held there until there is no more ammonia being evolved as shown by a test with phenolphthalein paper. This is then broken to 8–12 mesh size and is ready for use.

131.5 g. of ethyl-α-hydroxy-isobutyrate is passed at 375° C. through this catalyst at a space velocity of 525. The final yield of ethyl methacrylate is 12%, calculated on the amount of ethyl-α-hydroxy-isobutyrate used.

2. 177.5 g. of ethyl-α-hydroxy-isobutyrate is passed over the same catalyst at 375° and a space velocity of 234. The yield of ethyl methacrylate is 57%.

3. A mixture of 217.5 g. of ethyl-α-hydroxyisobutyrate and 59.7 g. of water (molar ratio 1:2) is passed through the catalyst described in Example 1 at 350° C. and a space velocity of 567. The yield of ethyl methacrylate is 41%.

4. A mixture of 168.0 g. of ethyl-α-hydroxyisobutyrate and 46.0 g. of water is passed through the catalyst described in Example 1 at 375° and a space velocity of 560. The yield of ethyl methacrylate is 64%.

5. A mixture of 228 g. of ethyl-α-hydroxy-isobutyrate and 62.1 g. of water is passed through the same catalyst at 375° C. and a space velocity of 630. The yield of ethyl methacrylate is 54%.

6. A mixture of 214.0 g. of ethyl-α-hydroxyisobutyrate and 58.0 g. of water is passed through the same catalyst at 400° and a space velocity of 545. The yield of ethyl methacrylate is 41%.

7. 149 g. of ethyl-α-hydroxy-isobutyrate is passed through the same catalyst at 400° and a space velocity of 253. The yield of ethyl methacrylate is 12%.

8. A mixture of 140 g. of methyl-α-hydroxyisobutyrate and 47 g. of water is passed through the same catalyst at 375° and a space velocity of 722. The yield is 50% of methyl methacrylate.

9. A mixture of 99 g. of methyl-α-hydroxyisobutyrate and 33 g. of water is passed through the same catalyst at 375° and a space velocity of 553. The yield of methyl methacrylate is 49%.

10. Another catalyst of similar composition is made by mixing one mol of freshly precipitated aluminum hydroxide with two mols of phosphoric acid and heating the transparent, syrupy mass until it sets to a hard, granular mass, presumably AlPO4 and polymerized H3PO4.

A mixture of 115.5 g. of ethyl-α-hydroxy-isobutyrate and 31.3 g. of water is passed over this catalyst at 375° and a space velocity of 662. The yield of ethyl methacrylate is 74%.

11. Another catalyst made in exactly the same manner as described in Example 10 is prepared.

A mixture of 121.5 g. of ethyl-α-hydroxy-isobutyrate and 33.0 g. of water is passed over this catalyst at 375° C. and a space velocity of 560. The yield of ethyl methacrylate is 57%.

12. Another catalyst is made the same as that shown in Example 1 except that one-half of the aluminum is replaced by magnesium calculated on the molecular weight basis.

A mixture of 131.9 g. of ethyl-α-hydroxy-isobutyrate and 36.1 g. of water is passed over this catalyst at 375° and a space velocity of 553. A yield of ethyl methacrylate of 54% is obtained.

13. A mixture of 134.6 g. of ethyl-α-hydroxyisobutyrate and 36.9 g. of water is passed over the catalyst described in Example 12 at 375° and a space velocity of 1085. A yield of ethyl methacrylate of 27% is obtained.

14. A mixture of 134.8 g. of ethyl-α-hydroxyisobutyrate and 36.5 g. of water is passed over the same catalyst at 375° and a space velocity of 293. A yield of ethyl methacrylate of 37% is obtained.

15. Another catalyst is made up the same as that shown in Example 12 replacing the magnesium with manganese in the same proportion.

A mixture of 130.9 g. of ethyl-α-hydroxy-isobutyrate and 35.6 g. of water is passed over this catalyst at 375° and a space velocity of 547. The yield of ethyl methacrylate is 58%.

16. A mixture of 123.7 g. of ethyl-α-hydroxyisobutyrate and 33.1 g. of water is passed over this same catalyst at 375° and a space velocity of 557. The yield of ethyl methacrylate is 53%.

17. A mixture of 117.9 g. of ethyl-α-hydroxyisobutyrate and 64.9 g. of water (4 mols of water to one of ester) is passed over the same catalyst at 375° and a space velocity of 748. The yield of ethyl methacrylate is 59%.

18. A mixture of 127.6 g. of ethyl-α-hydroxyisobutyrate and 34.6 g. of water is passed over the same catalyst at 375° and a space velocity of 524. The yield of ethyl methacrylate is 69%.

19. A mixture of 168.8 g. of ethyl-α-hydroxyisobutyrate and 46.2 g. of water is passed over the same catalyst at 375° and a space velocity of 560. The yield of ethyl methacrylate is 67%.

In the foregoing examples the catalytic dehydration of methyl and ethyl α-hydroxy-isobutyrates has been described. The process, however, may also be applied to the α-hydroxy-isobutyric acid esters of other primary alkyl alcohols such as the n-propyl, n-butyl, n-amyl, isobutyl, iso-amyl and the higher normal or branched-chain primary alcohols. It is not generally applicable to esters of secondary or tertiary alcohols on account of the excessive extent of side reactions which give undesirable by-products.

We claim:

1. A process for converting an ester of α-hydroxy-isobutyric acid to the corresponding ester of methacrylic acid which comprises passing the vapor of the α-hydroxy-isobutyric acid ester in contact with a dehydrating catalyst at a temperature of from about 325° C. to about 425° C.

2. A process for converting an ester of α-hydroxy-isobutyric acid to the corresponding ester of methacrylic acid which comprises passing a mixture of the vapor of the α-hydroxy-isobutyric acid ester and a diluent in contact with a dehydrating catalyst at a temperature of from about 325° C. to about 425° C.

3. A process for converting an ester of α-hydroxy-isobutyric acid to the corresponding ester of methacrylic acid which comprises passing a mixture of the vapors of the α-hydroxy-isobutyric acid ester and water in contact with a dehydrating catalyst at a temperature of from about 325° C. to about 425° C.

4. A process for preparing ethyl methacrylate which comprises dehydrating ethyl-α-hydroxyisobutyrate by passing its vapor over a dehydrating catalyst at a temperature of from about 325° C. to about 425° C.

5. A process for preparing methyl methacrylate which comprises dehydrating methyl-α-hydroxyisobutyrate by passing its vapor over a dehydrating catalyst at a temperature of from about 325° C. to about 425° C.

6. A process for preparing ethyl methacrylate which comprises dehydrating ethyl-α-hydroxyisobutyrate by passing a mixture of the vapors of ethyl-α-hydroxy-isobutyrate and water in contact with a dehydrating catalyst at a temperature of from about 325° C. to about 425° C.

7. A process for preparing methyl methacrylate which comprises dehydrating methyl-α-hydroxyisobutyrate by passing a mixture of the vapors of methyl-α-hydroxy-isobutyrate and water in contact with a dehydrating catalyst at a temperature of from about 325° C. to about 425° C.

8. The process for converting an ester of α-hydroxy-isobutyric acid to the corresponding ester of methacrylic acid which comprises passing the vapor of the α-hydroxy-isobutyric acid ester in contact with a dehydrating catalyst containing a phosphate of aluminum at a temperature from about 325° C. to about 425° C.

9. The process for converting an ester of α-hydroxy-isobutyric acid to the corresponding ester of methacrylic acid which comprises passing a mixture of the vapor of the α-hydroxy-isobutyric acid ester and a diluent in contact with a dehydrating catalyst containing a phosphate of aluminum at a temperature of from about 325° C. to about 425° C.

10. The process for preparing ethyl methacrylate which comprises dehydrating ethyl-α-hydroxy-isobutyrate by passing a mixture of the vapors of ethyl-α-hydroxy-isobutyrate and water in contact with a dehydrating catalyst containing a phosphate of aluminum at a temperature of from about 325° C. to about 425° C.

11. The process for preparing methyl methacrylate which comprises dehydrating methyl-α-hydroxy-isobutyrate by passing a mixture of the vapors of methyl-α-hydroxy-isobutyrate and water in contact with a dehydrating catalyst containing a phosphate of aluminum at a temperature of from about 325° C. to about 425° C.

12. The process for converting an ester of α-hydroxy-isobutyric acid to the corresponding ester of methacrylic acid which comprises passing the vapor of the α-hydroxy-isobutyric acid ester in contact with a dehydrating catalyst containing a mixture of a phosphate of aluminum and one of the group consisting of phosphates of manganese and magnesium at a temperature of from about 325° C. to about 425° C.

13. The process for converting an ester of α-hydroxy-isobutyric acid to the corresponding ester of methacrylic acid which comprises passing a mixture of the vapor of the α-hydroxy-isobutyric acid ester and a diluent in contact with a dehydrating catalyst containing a mixture of a phosphate of aluminum and one of the group consisting of phosphates of manganese and magnesium at a temperature of from about 325° C. to about 425° C.

14. The process for preparing ethyl methacrylate which comprises dehydrating ethyl-α-hydroxy-isobutyrate by passing a mixture of the vapors of ethyl-α-hydroxy-isobutyrate and water in contact with a dehydrating catalyst containing a mixture of a phosphate of aluminum and one of the group consisting of phosphates of manganese and magnesium at a temperature of from about 325° C. to about 425° C.

15. The process for preparing methyl methacrylate which comprises dehydrating methyl-α-hydroxy-isobutyrate by passing a mixture of the vapors of methyl-α-hydroxy-isobutyrate and water in contact with a dehydrating catalyst containing a mixture of a phosphate of aluminum and one of the group consisting of phosphates of manganese and magnesium at a temperature of from about 325° C. to about 425° C.

HERMAN A. BRUSON.
ROBERT N. WASHBURNE.